United States Patent [19]

Lechner et al.

[11] 4,355,252
[45] Oct. 19, 1982

[54] SYNCHRONOUS MOTOR

[75] Inventors: Hubert Lechner, Cham; Benedikt Steinle, Zug, both of Switzerland

[73] Assignee: LGZ Landis & Gyr Zug AG, Zug, Switzerland

[21] Appl. No.: 153,693

[22] Filed: May 27, 1980

[30] Foreign Application Priority Data

May 30, 1979 [CH] Switzerland ............... 5030/79

[51] Int. Cl.³ .................................. H02K 19/00
[52] U.S. Cl. ................................ 310/162; 310/172
[58] Field of Search .............. 310/41, 162, 163, 164, 310/172

[56] References Cited

U.S. PATENT DOCUMENTS

| | | | |
|---|---|---|---|
| 2,437,142 | 3/1948 | Welch et al. | 310/164 |
| 2,951,957 | 9/1960 | Eigeman | 310/172 |
| 3,737,695 | 6/1973 | Kilmer | 310/162 |
| 3,808,491 | 4/1974 | Riggs | 310/162 |
| 4,012,652 | 3/1977 | Gilbert | 310/162 |

FOREIGN PATENT DOCUMENTS

| | | | |
|---|---|---|---|
| 562667 | 5/1958 | Belgium | 310/164 |
| 2226333 | 5/1973 | Fed. Rep. of Germany | |
| 1915193 | of 0000 | Fed. Rep. of Germany | |
| 1195481 | 11/1959 | France | |
| 453022 | of 0000 | United Kingdom | |
| 876576 | 9/1936 | United Kingdom | |
| 569343 | 5/1945 | United Kingdom | 310/164 |
| 1209157 | 10/1970 | United Kingdom | |
| 1273679 | 5/1972 | United Kingdom | |

*Primary Examiner*—J. D. Miller
*Assistant Examiner*—D. L. Rebsch
*Attorney, Agent, or Firm*—Ernest F. Marmorek

[57] ABSTRACT

In a self-starting unidirectional synchronous motor which includes a stator, an exciting coil at least partly disposed within the stator, a permanent magnet type rotor which has a plurality of rotor poles and is at least partly disposed within the coil, and wherein a space is defined between the rotor and the coil, and the stator includes groups of unshaded main poles and groups of shaded auxiliary poles alternating with each other, and respective end zones are defined between adjacent groups, and each pole generates a corresponding magnetic field, the poles comprise pole arms extending into the space and include half poles disposed at least near the end zones, respectively, and wherein the groups of shaded poles are displaced with respect to the groups of non-shaded poles by respective spatial electrical angles, and the magnetic fields of groups of shaded poles are shifted with respect to groups of non-shaded poles by respective phase angles.

6 Claims, 5 Drawing Figures

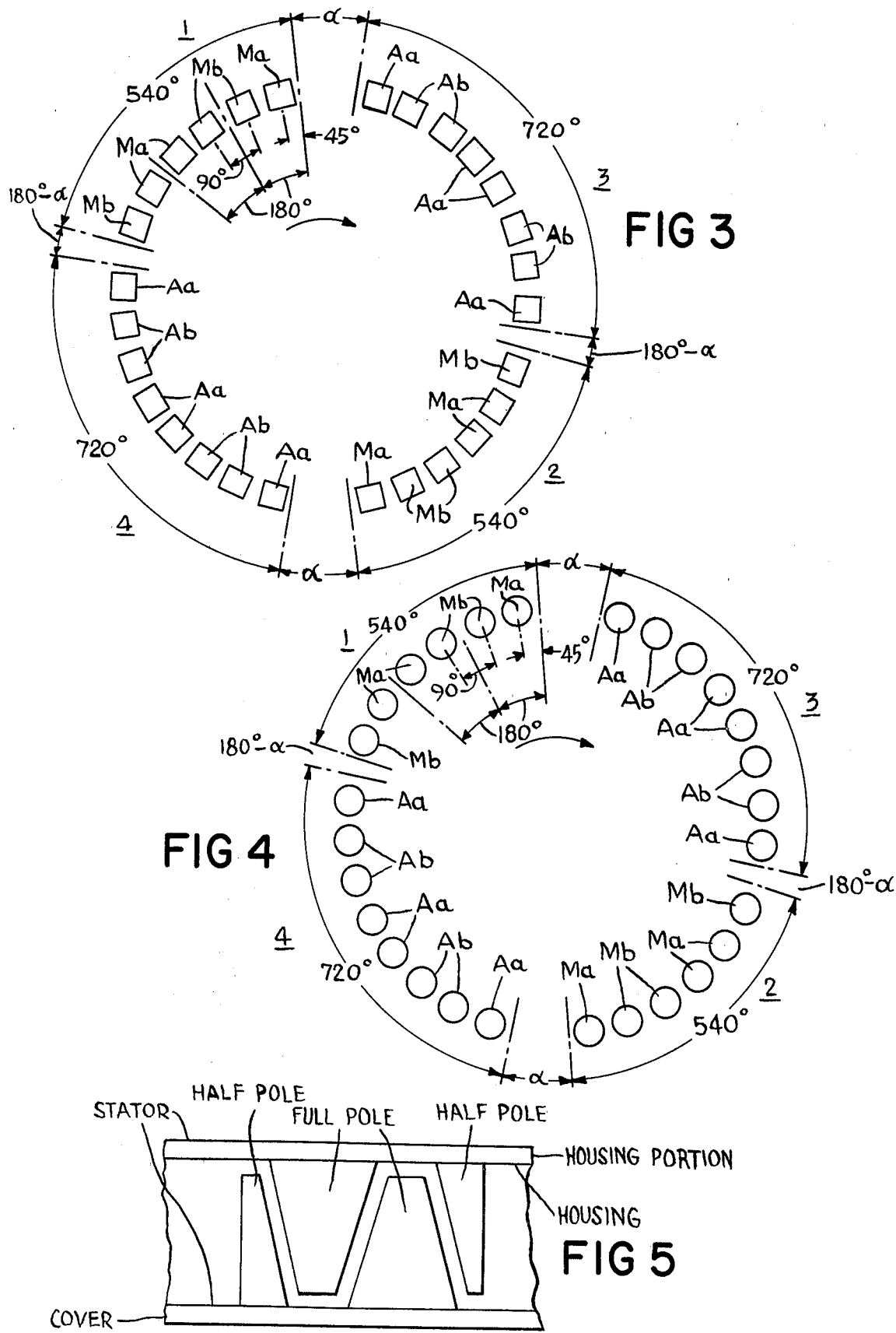

SYNCHRONOUS MOTOR

CROSS-REFERENCE TO RELATED PATENTS

U.S. Pat. No. 2,437,142, issued to Welch et al in 1948, and U.S. Pat. No. 3,808,491, issued to Riggs in April 1974, are incorporated by reference into the present application.

BACKGROUND OF THE INVENTION

Self-starting unidirectional synchronous motors are known, which have a first plurality of main poles, and a second plurality of auxiliary poles. Alternating fields are formed between the poles of the main pole group, and the poles of the auxiliary pole group of the stator, which are spatially displaced by respective electrical angles, and whose magnetic fields are shifted by respective phase angles and wherein the fields are superimposed, and together constitute a rotating field, which acts on the rotor of the synchronous motor. The stator poles of known synchronous motors have a uniform rectangular cross-section and are formed by pole arms. As two adjoining poles, within a pole group, namely poles disposed physically opposite one another and supported on different respective stator halves are designed to cooperate, there occur in end zones between the pole groups pole halves, wherein a pole half may lack a corresponding partner within the respective pole group. Hence in known synchronous motors there does not occur any uniform spatial distribution of the fields within a pole group, so that an elliptical rotating field results. When the motor is lightly loaded, it can even run backwards under those conditions. There also occur very significant fluctuations of the angular velocity of the rotor, which reduces the motor torque. The static torque, which is effective during synchronous operation of the motor, also contributes, as does the elliptical rotating field, to fluctuations of the angular velocity of the motor, and loss of total operative torque. Between the pole groups occur narrow passages for the shading rings where poles supported from the same stator portion are disposed next to one another, which arrangement reduces the effectiveness of the shading rings.

The basic operation of a synchronous motor of the type described in the present application is taught by Welch et al, U.S. Pat. No. 2,437,142 issued in 1948. Gerber teaches a small synchronous motor disclosed in Swiss patent CH 507,612 which uses only one group of main poles and one group of auxiliary poles, which poles extend approximately around respective halves of the stator periphery.

A unidirectional synchronous motor is taught by Eigeman in German patent AL 1,128,546. Eigeman teaches a synchronous motor which has a smaller number of main poles than of auxiliary poles, and where the auxiliary poles are shifted with respect to main poles of the same polarity by an angle of $360° + \alpha$ electrical degrees, where $\alpha = 180° - \psi$ electrical degrees, $\psi$ being the phase shift between the flux of the main poles and that of the auxiliary poles of the same polarity.

Riggs, in U.S. Pat. No. 3,808,491, teaches a shaded pole unidirectional synchronous motor which employs an odd number of shaded stator poles, and an odd number of non-shaded stator poles. The number of shaded poles exceeds the number of non-shaded poles, and the shaded and non-shaded poles are arranged in groups, the separation between groups differing by $540 + \alpha$, or $540 - \alpha$ electrical degrees, where $\alpha$ is the shading angle. The stator poles extend from an upper cover and lower mounting plate, respectively, to form a cylindrical cage, and are designed to function with an A.C. excited toroidal coil outside the cage, and a ferrite rotor with induced poles thereon, rotatably mounted within the cage formed by the stator poles.

SUMMARY OF THE INVENTION

One of the principal objects of the present invention is to devise a synchronous motor which has a very low static torque, which has a uniform spatial field distribution within each pole group, and wherein narrow passages for the shading rings are avoided to the largest practical extent.

This object is achieved in a self-starting unidirectional synchronous motor including a stator, wherein an exciting coil is at least partly disposed within the stator, a permanent magnet type rotor having a plurality of rotor poles is at least partly disposed within the coil, a space is defined between the rotor and the coil, and wherein the stator includes a plurality of poles, and the poles include groups of unshaded main poles and groups of shaded auxiliary poles alternating with each other, respective end zones being defined between adjacent groups, and wherein each pole generates a corresponding magnetic field, by the poles comprising pole arms extending into the space and including half poles disposed at least near the end zones, respectively, and wherein groups of shaded poles are displaced with respect to groups of non-shaded poles by respective spatial electrical angles, and the magnetic fields of groups of shaded poles are shifted with respect to groups of non-shaded poles by respective phase angles.

In one embodiment of the invention each pole comprises two pole arms which have a center-to-center distance of about 90 electrical degrees.

It is advantageous if the stator includes first and second end portions, and if each end portion includes one half of the plurality of poles, and one end portion is similar to the other end portion.

The groups of unshaded main poles preferably comprise a first number of h main pole pairs, and the group of shaded auxiliary poles preferably comprise a second number of s auxiliary pole pairs, and wherein the spatial angle is denoted by $\alpha$, and the phase angle is denoted by $\psi$, the spatial angle being defined by $\alpha = \arccos(-h/s)$, and the phase angle being defined by $\psi = \arccos(h/s)$, and wherein $h < s$.

In another embodiment each pole arm has a substantially circular cross-section.

It is advantageous if each pole arm has a free end, and if the cross-section of the other end is greater than the cross-section of the free end.

Further objects and advantages of the invention will be set forth in part in the following specification and in part will be obvious therefrom without being specifically referred to, the same being realized and attained as pointed out in the claims hereof.

BRIEF DESCRIPTION OF THE DRAWING

For a fuller understanding of the nature and objects of the invention, reference should be had to the following detailed description, taken in connection with the accompanying drawings, in which various schematic arrangements of poles is shown. Specifically:

FIG. 3 is a schematic plan view of an arrangement of stator poles in a second embodiment of the present invention;

FIG. 4 is a schematic plan view of an arrangement of stator poles in a third embodiment of the present invention; and FIG. 5 is an elevational view of a portion of a stator with pole arms of specific construction, according to the present invention.

DESCRIPTION OF THE PREFERRED EMBODIMENTS

Figure 1:
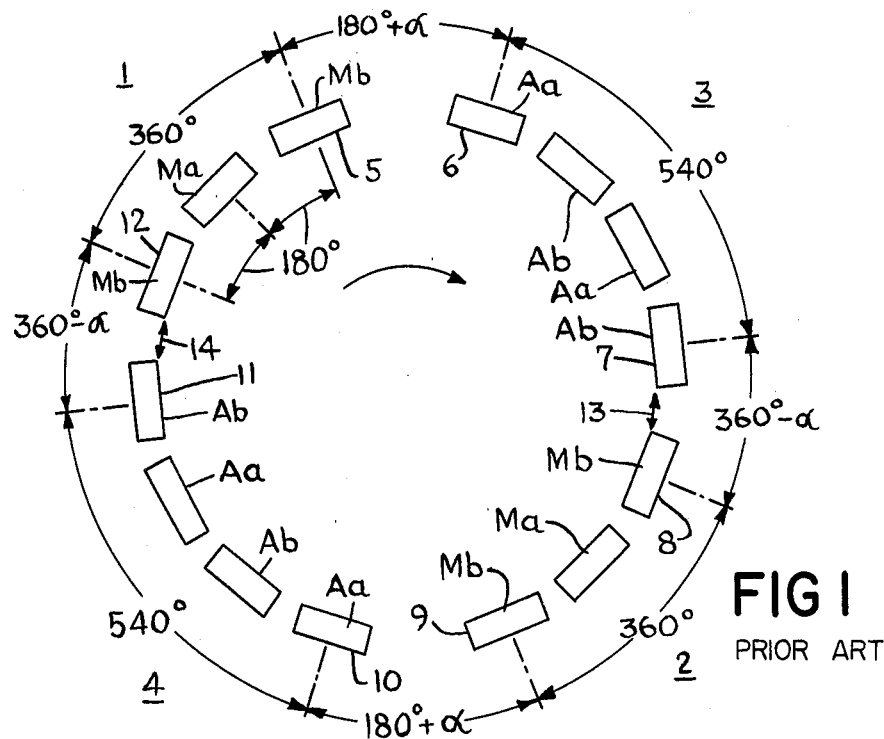
FIG. 1 is a schematic diagram of an arrangement of poles in a stator of the prior art.

As is known, synchronous motors of the prior art, as, for example, the motor taught by Riggs, include a stator which has an annular hollow space, and is composed, for example, of a ferrous mounting 26, and a ferrous cover 10. An exciting coil, such as for example the toroidal coil 18, which has an opening of a smaller diameter than that of the annular hollow space, is disposed at least partly within the stator, and a non-salient pole rotor, such as the rotor 19, which may also be a permanent magnet type rotor, has a plurality of rotor poles and is at least partly disposed within the coil; a space is defined between the rotor and the coil. The poles include groups of unshaded main poles, and groups of shaded auxiliary poles. Shading means, such as first and second shading rings 12 and 23, respectively, separate the auxiliary poles from the main poles.

Referring now to the drawings of the present invention, and in particular to FIGS. 1-4, main poles of the mounting or housing of the motor are designated as Ma, main poles of the cover of the motor are designated as Mb, and wherein the poles of the housing and those of the cover of the motor are disposed substantially opposite one another, auxiliary poles of the housing are designated as Aa, and auxiliary poles of the cover are designated as Ab.

Another arrangement of poles of the prior art and somewhat different from Riggs, is shown in FIG. 1. There can be seen two main pole groups 1 and 2 and two auxiliary pole groups 3 and 4 forming 14 pole arms, each with a rectangular cross-section, constituting three main pole pairs and four auxiliary pole pairs. Of the total of 28 pole halves, 8 pole halves, namely pole halves 5 through 12, are disposed in end zones defined between respective pole groups, which end zones prevent the formation of a spatially uniform distribution of magnetic fields within the pole groups 1 and 2, and 3 and 4, respectively. Between the pole groups 2, 3, and 1, 4, respectively, there occur two narrow passages 13 and 14, where poles of the same stator end portion are disposed next to one another, which passages are reserved for shading rings.

A synchronous motor using this type of pole groupings in a stator has all the aforesaid disadvantages.

Figure 2:
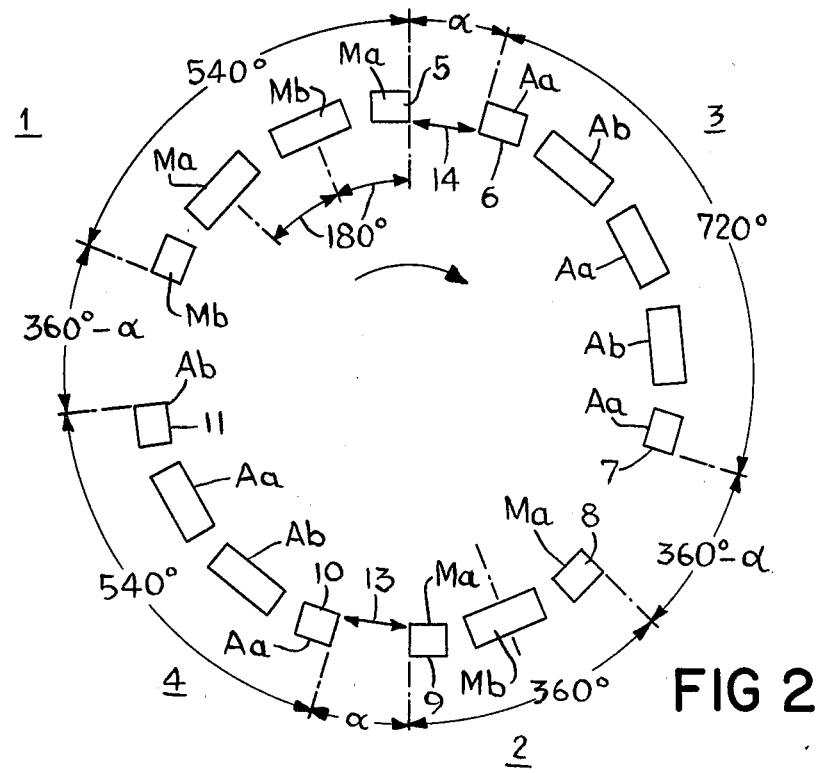
FIG. 2 is a schematic plan view of an arrangement of stator poles in a first embodiment of the present invention.

The arrangements of stator poles according to the present invention shown in FIG. 2 also contains two main pole groups 1, 2 and two auxiliary pole groups 3, 4, constituting a total of 16 pole arms, which in contrast to those shown in FIG. 1, have different respective cross-sections, there occuring two and one-half main pole pairs, and three and one-half auxiliary pole pairs. According to the invention, the poles of each pole group are formed in respective end zones between the pole groups 1, 3; 2, 4; 2, 3; and 1, 4, respectively, as half poles having pole arms 5 through 12, respectively. Each pole half therefore has another "partner" associated with it in the same pole group. By suitable choice of the electrical displacement angle α and the phase shift angle α, it is possible to obtain a rotating magnetic field, which has decidedly unidirectional characteristics and results in a relatively high pull-out torque for the motor.

A preferred apportionment of angles results if the electrical angle α is defined by α=arc cos (−h/s), and where the phase shift angle ψ is determined from ψ=arc cos (h/s), and wherein α+ψ=108 electrical degrees, where h is smaller than s, and h constitutes the number of main pole pairs, and s the number of auxiliary pole pairs. In the present example, α=132 electrical degrees, ψ=44 electrical degrees, and the number of effective pole halves is 24, compared to 20 effective pole halves according to the prior art of FIG. 1. The pull-out torque increases also in the same ratio. In the end zones, poles from different stator end portions are no longer spaced close to one another so that stray fields causing interference could arise, and the previously relatively narrow passages 13 and 14 reserved for the shading rings are enlarged compared to the narrow passages shown in FIG. 1.

The static torque, which may still occur in the embodiment shown in FIG. 2 can be considerably reduced, if the full poles of the stator include two pole arms having a center-to-center distance of about 90 electrical degrees.

A pole arrangement having such a small static torque is shown in FIG. 3. It also includes two main pole groups 1 and 2, and two auxiliary pole groups 3 and 4, all having pole arms of uniform cross-section, and comprising three main pole pairs, and four auxiliary pole pairs. As each full pole is now formed by two pole arms, the implementation example shown in FIG. 3 includes a total of twenty eight pole arms. According to a preferred dimensioning, the electrical displacement angle α=138 degrees, and the phase shift angle ψ=42 electrical degrees.

A stator wherein each pole arm has a substantially circular cross-section and wherein the pole groups comprise pole arms which have a center-to-center distance of about 90 electrical degrees is shown in FIG. 4.

An elevational view of a portion of a stator wherein each pole arm has a free end, the other end being mounted on either the housing portion 12, or the cover 14 of a stator 10, is shown in FIG. 5. Each full pole is denoted by 16, and each half pole by 18. It will be seen that the cross-section of the mounted end of each pole—whether a half pole 18, or a full pole 16—is greater than the cross-section of the free end of the corresponding pole.

The static torque of the synchronous motor, according to the present invention, can be further reduced, if the end of the pole arm affixed to a corresponding stator end portion, such as either the housing, or the cover, has a cross-section which is greater than the cross-section of the free end of the pole arm, or if the rotor poles are disposed in a direction transverse to the axis of the rotor corresponding somewhat to the configuration of a worm gear.

For manufacturing reasons it may be preferable to provide each pole arm of the half poles with a circular cross-section.

Having thus described the invention, what I claim as new and desire to be secured by Letters Patent is as follows:

1. In a self-starting unidirectional synchronous motor including a stator, an exciting coil being at least partly disposed within said stator, a permanent magnet rotor having a plurality of rotor poles being at least partly disposed within said coil, a space being defined between said rotor and said coil, said stator including a plurality of poles, said poles including groups of unshaded main poles and groups of shaded auxiliary poles alternating with each other, respective end zones being defined between adjacent groups, each pole generating a corresponding magnetic field, said poles comprising pole arms extending into said space and including one half pole in each of said groups disposed at said end zones, respectively, and wherein groups of shaded poles are displaced with respect to groups of non-shaded poles by respective substantially equal spatial electrical angles, and the magnetic fields of groups of shaded poles are shifted with respect to the magnetic fields of groups of non-shaded poles by respective substantially equal phase angles.

2. A synchronous motor as claimed in claim 1, wherein each pole comprises two pole arms which have an electrical center-to-center distance of about 90 electrical degrees.

3. A synchronous motor as claimed in claim 1, wherein said stator includes first and second end portions and wherein each end portion includes one half of said plurality of poles, one end portion being similar to the other end portion.

4. A synchronous motor as claimed in claim 1, wherein said groups of unshaded main poles comprise a first number of h main pole pairs, and said group of shaded auxiliary poles comprise a second number of s auxiliary pole pairs, and wherein the spatial angle is denoted by $\alpha$, and the phase angle is denoted at $\psi$, said spatial angle being defined by $\alpha = \arc\cos(-h/s)$, said phase angle being defined by $\psi = \arc\cos(=h/s)$, and wherein $h < s$.

5. A synchronous motor as claimed in claim 2, wherein each pole arm has a substantially circular cross-section.

6. A synchronous motor as claimed in claim 1, wherein each pole arm has a free end, and wherein the cross-section of the other end is greater than the cross-section of said free end.

* * * * *